United States Patent [19]

Lee

[11] Patent Number: 4,861,676
[45] Date of Patent: Aug. 29, 1989

[54] IMPROVED COEXTRUDABLE ADHESIVE AND PRODUCTS THEREFROM

[75] Inventor: I-Hwa Lee, Wilmington, Del.

[73] Assignee: E. I. Du Pont de Nemours and Company, Wilmington, Del.

[21] Appl. No.: 237,171

[22] Filed: Aug. 29, 1988

[51] Int. Cl.$^4$ .................... C08L 25/04; C08L 51/04; C08L 51/06

[52] U.S. Cl. .................... 428/516; 525/71; 525/74; 525/78; 525/80; 525/81; 525/72

[58] Field of Search ............. 525/71, 74, 78, 80, 525/81, 72; 428/516

[56] References Cited

U.S. PATENT DOCUMENTS

| | | | |
|---|---|---|---|
| 3,932,332 | 1/1976 | Douglas et al. | 260/28.5 |
| 4,358,557 | 11/1982 | Boggs | 524/272 |
| 4,576,995 | 3/1986 | Nakabayashi et al. | 525/285 |
| 4,670,349 | 6/1987 | Nakagawa et al. | 428/516 |

FOREIGN PATENT DOCUMENTS

| | | |
|---|---|---|
| 53-018653 | 2/1978 | Japan . |
| 53-127546 | 11/1978 | Japan . |
| 54-057582 | 5/1979 | Japan . |
| 58-203043 | 11/1983 | Japan . |
| 59-055743 | 3/1984 | Japan . |

*Primary Examiner*—Carman J. Seccuro

[57] ABSTRACT

A blend of ethylene copolymer, ethylene copolymer modified by grafting with a comonomer containing pendant acid or acid derivative functionality, styrene polymer, and alicyclic resin modifier or stabilized rosin ester provides a useful adhesive, particularly for bonding polystyrene to barrier polymers.

18 Claims, No Drawings

IMPROVED COEXTRUDABLE ADHESIVE AND PRODUCTS THEREFROM

BACKGROUND OF THE INVENTION

The invention relates to an extrudable adhesive composition of ethylene copolymer, modified ethylene copolymer, styrene polymer, and saturated alicyclic hydrocarbon resin, useful for bonding polystyrene to barrier polymers.

Copending U.S. patent application No. 07/202,033, filed June 3, 1988 by the present inventor, discloses a blend of ethylene vinyl acetate copolymer, ethylene vinyl acetate copolymer modified by grafting with a comonomer containing pendant acid or acid derivative functionality, and impact modified polystyrene, which provides a useful adhesive, particularly for bonding polystyrene to gas barrier polymers.

Similar adhesive systems for laminates are known in the art. For example, Japanese application No. 53 018 653, to Imura et al., discloses a resin composition which is obtained by mixing 3–100 parts by weight of a hydrogenated petroleum resin with 100 parts by weight of an ethylene carboxylate-vinyl acetate copolymer which has been obtained by copolymerizing an unsaturated carboxylic acid and/or its anhydride with at least one vinylidene monomer in the presence of an ethylene-vinyl acetate copolymer.

U.S. Pat. No. 4,670,349, to Nakagawa et al., discloses an adhesive resin composition of (A) an ethylene vinyl acetate or ethylene alpha-olefin random copolymer, (B) a modified polyethylene containing 0.01 to 10% by weight of an unsaturated carboxylic acid or its derivative grafter thereto, and (C) 1 to 125 parts by weight of a hydrogenated aromatic petroleum resin. The resin is suitable as an adhesive for laminating polystyrene to ethylene vinyl alcohol copolymer.

U.S. Pat. No. 4,358,557, to Boggs, discloses a hot-melt adhesive composed of ethylene vinyl acetate copolymer, a tackifier selected from hydrocarbon resin, polyterpene resin or rosin ester, a paraffin wax and an aromatic hydrocarbon resin.

U.S. Pat. No. 3,932,332, to Douglas et al., discloses an adhesive of ethylene vinyl acetate copolymer, a paraffin wax and a copolymer of styrene and alpha-methyl styrene.

U.S. Pat. No. 4,576,995, to Nakabayashi et al., discloses an adhesive for bonding ethylene/vinyl alcohol copolymer and polystyrene, which comprises a modified ethylene/vinyl acetate copolymer obtained by graft-copolymerizing a styrenic vinyl monomer and an alpha, beta-unsaturated carboxylic acid to an ethylene/vinyl acetate copolymer. Laminates prepared therefrom are valuable as a deep draw forming material with enhanced gas barrier properties.

Japanese application No. 54057582 (reported as Derwent Abstract No. 46260B/25) discloses a resin laminate of a polystyrene resin layer, a layer of ethylene-vinyl acetate copolymer saponification product, and a layer of a styrene/butadiene block copolymer containing 60% butadiene, ethylene vinyl acetate copolymer (6 mol % VA), and a maleic anhydride-ethylene vinyl acetate graft copolymer.

Japanese application No. 58203043 (reported as Derwent Abstract No. 84-008480/02) discloses a similar laminate, in which the adhesive layer is a blend of polystyrene, ethylene-vinyl acetate copolymer (5–50% VA), and a polyolefin grafted with e.g. maleic anhydride.

Japanese application No. 59055743 discloses a process for production of resin laminates characterized by melt coextrusion of a styrene group resin layer, a gas barrier resin layer such as saponified ethylene-vinyl acetate copolymer, and a bonding layer of (a) ethylene-vinyl acetate copolymer graft-modified with unsaturated carboxylic acid or anhydride, and (b) ethylene-vinyl acetate copolymer which is graft-modified with e.g. styrene, or further (c) unmodified ethylene-vinyl acetate copolymer.

SUMMARY OF THE INVENTION

The present invention provides an extrudable bonding resin composition consisting essentially of:

(a) about 35 to about 84 percent by weight of an ethylene copolymer portion consisting essentially of (i) about 1 to 100 percent by weight of a copolymer of about 45 to about 95 weight percent ethylene and about 5 to about 55 weight percent of at least one comonomer copolymerized therewith selected from the group consisting of unsaturated mono- or dicarboxylic acids of 2–20 carbon atoms, esters of said unsaturated mono- or dicarboxylic acids, vinyl esters of saturated carboxylic acids where the acid group has 1–18 carbon atoms, acrylonitrile, methacrylonitrile, and carbon monoxide, the carbon monoxide being present in an amount of 0 to about 30 weight percent; and a grafted comonomer containing pendant carboxylic acid or carboxylic acid derivative functionality, wherein the amount of said grafted comonomer comprises about 0.03 to about 0.5 percent by weight of the total bonding resin composition, and (ii) 0 to about 99 percent by weight of a copolymer of about 45 to about 95 weight percent ethylene and about 5 to about 55 weight percent of at least one comonomer copolymerized therewith selected from the group consisting of unsaturated mono- or dicarboxylic acids of 2–20 carbon atoms, esters of said unsaturated mono- or dicarboxylic acids, vinyl esters of saturated carboxylic acids where the acid group has 1–18 carbon atoms, acrylonitrile, methacrylonitrile, and carbon monoxide, the carbon monoxide being present in an amount of 0 to about 30 weight percent, wherein the copolymer of (i) and the copolymer of (ii) contain at least one said copolymerized comonomer in common, the amount of each such common comonomer in the copolymer of (ii) being within about 10% of the amount of the corresponding comonomer in copolymer (i), and the total amount of said copolymerized comonomers other than such common comonomers in either copolymer being less than about 10%;

(b) about 15 to about 45 percent by weight polystyrene; and (c) about 1 to about 25 weight percent of a saturated alicyclic hydrocarbon resin having a degree of saturation of at least about 80%.

The present invention further provides a laminated structure comprising at least one structural layer, at least one barrier layer, and at least one layer of the above resin composition used as a bonding layer. Such structures exhibit desirable combinations of structural strength and barrier properties, with excellent adhesion between the layers.

DETAILED DESCRIPTION OF THE INVENTION

The extrudable bonding resin of the present invention comprises a blend of about 35 to about 84 percent by weight, preferably about 45 to about 65 percent by weight, of an ethylene copolymer component, about 15 to about 45 weight percent polystyrene, and about 1 to about 25 weight percent of a saturated alicyclic hydrocarbon resin. The ethylene copolymer component comprises an ethylene copolymer grafted with pendant acid or acid derivative functionality. This grafted copolymer may be blended, if desired, with additional ungrafted ethylene copolymer. Such blending may be desirable in order to minimize the amount of the relatively more expensive grafted material, while maintaining the excellent adhesive properties of the composition.

The grafted ethylene copolymer is present in amounts of about 1 to about 100, and preferably about 3 to about 50 percent by weight of the ethylene copolymer portion of the composition. This component is a copolymer containing about 5 to about 55, and preferably about 9 to about 30 weight percent copolymerized comonomer selected from the group consisting of unsaturated mono- or dicarboxylic acids of 2–20 carbon atoms, esters of said unsaturated mono-or dicarboxylic acids, vinyl esters of saturated carboxylic acids where the acid group has 1–18 carbon atoms, acrylonitrile, methacrylonitrile, and carbon monoxide, the carbon monoxide being present in an amount of 0 to about 30 weight percent. (The amount of carbon monoxide is limited only because it is believed that preparation of polymers containing more than about 30 weight percent carbon monoxide is not feasible due to problems of reactor fouling.) Vinyl acetate is a preferred comonomer, but methyl acrylate, n-butyl acrylate, and the like, optionally with carbon monoxide present as a third monomer, are also quite suitable. The balance of the copolymer is substantially copolymerized ethylene. Such copolymers are prepared by the well-known addition polymerization processes. Onto this copolymer is grafted an additional comonomer containing pendant carboxylic acid or carboxylic acid derivative functionality. The melt index of the resulting graft copolymer, as measured by ASTM D1238 Condition "E", should be about 0.5 to about 40. Outside of these ranges, processing becomes more difficult, and flow instabilities may result.

The grafting monomer is selected from the group consisting of ethylenically unsaturated mono-di-, or polycarboxylic acids and ethylenically unsaturated carboxylic acid anhydrides, including derivatives of such acids or anhydrides. Examples of the acids and anhydrides include acrylic acid, methacrylic acid, maleic acid, fumaric acid, itaconic acid, crotonic acid, itaconic anhydride, maleic anhydride, and dimethyl maleic anhydride. Examples of suitable derivatives includes salts, amides, imides, and esters of such acids or anhydrides, for example, mono- and disodium maleate and diethyl fumarate. Among the acids and anhydrides that are particularly useful are maleic anhydride and maleic acid.

The method for grafting of the comonomer onto the ethylene copolymer can be any of the processes which are well known in the art. For example, grafting can be carried out in the melt without a solvent, as disclosed in European Patent Application No. 0 266 994, incorporated herein by reference, or in solution or dispersion. Melt grafting can be done using a heated extruder a Brabender TM or Banbury TM mixer or other internal mixers or kneading machines, roll mills, and the like. The grafting may be carried out in the presence of a radical initiator such as a suitable organic peroxide, organic perester, or organic hydroperoxide. The graft copolymers are recovered by any method which separates or utilizes the graft polymer that is formed. Thus the graft copolymer can be recovered in the form of precipitated fluff, pellets, powders, and the like.

The amount of monomer grafted onto the ethylene copolymer is not particularly limiting, and may be as low as about 0.03 weight percent or as much as about 5 percent or even more, based on the weight of the grafted ethylene copolymer. The total amount of graft comonomer in the total adhesive composition, however, is important, and should be between about 0.03 and about 0.5 weight percent of the total composition, in order to obtain superior adhesive and bonding properties.

The ungrafted ethylene copolymer is a copolymer similar to that described above, but without the grafted comonomer. In order to achieve good peel strength in laminates prepared from the present adhesive, the comonomer of the ungrafted copolymer should be of a type and amount sufficiently similar to that of the grafted copolymer that the grafted and ungrafted copolymers have a suitable degree of compatibility. Such copolymers are normally compatible if the grafted and the ungrafted copolymers contain the same or closely chemically related monomers (except for the graft comonomer) and the amounts of such monomers in the two copolymers are similar. Specifically, the grafted copolymer and the ungrafted copolymer should contain at least one said copolymerized comonomer in common and the amount of each such common comonomer in the grafted copolymer and the ungrafted copolymer should be within about 10%, and preferably within about 5%, of each other. Thus if the grafted copolymer is based on an ethylene polymer containing 20 weight % n-butyl acrylate, the ungrafted copolymer should contain between about 10 and about 30 weight percent n-butyl acrylate. Small amounts of additional comonomers may also be present in one or both copolymers, but in order to retain compatibility each copolymer should contain less than about 10% by weight of such comonomers that are not common to the other copolymer. Alternatively, closely similar comonomers, such as n-butyl acrylate and i-butyl acrylate could be interchanged while retaining compatibility. It is preferred that the graft copolymer be the same as the ungrafted copolymer, except for the presence of the grafted monomers. The melt index of the ungrafted copolymer should be about 0.05 to about 40.

The third component of the extrudable bonding resin composition is polystyrene, which may be either styrene homopolymer or impact modified polystyrene. This polystyrene component comprises about 15 to about 45, and preferably about 25 or 30 to about 40 weight percent of the composition. The polystyrene is a high molecular weight polymer, preferably having a molecular weight greater than about 50,000. Impact modified modified polystyrene, which is preferred, is a well-known material which is polystyrene modified by an elastomer such a polybutadiene elastomer or polybutadiene-styrene elastomer. This material is described, for example, in the Modern Plastics Encyclopedia, McGraw-Hill, p. 72 (1983–1984). It can be prepared by polymerizing styrene monomer in the presence of polybutadiene or styrene-butadiene elastomer, so that there arises both a physical blend as well as to some extent a graft copolymer. However, styrene-butadiene triblock copolymer may not be suitable if the amount of styrene in the polymer is too small. For example such as a copolymer containing only about 30 percent styrene component is not suitable, but block copolymers containing significantly higher levels, such as 80 or 90 percent styrene component, would be suitable for this invention.

The final major ingredient of the compositions of the present invention is a saturated alicyclic hydrocarbon resin. This resin comprises about 1 to about 25 weight percent, preferably about 5 to about 25 weight percent, of the composition. Such materials are known in commerce. The saturated alicyclic hydrocarbon resin can be produced by various methods. For example, it can be made by catalytically polymerizing light stream cracked naphtha and subsequently hydrogenating the product. Or it can be made by polymerizing an aromatic hydrocarbon such as styrene, alpha-methyl styrene, or vinyl toluene, 1-H indene or 2-H indene, and hydrogenating the resulting aromatic product, normally to a degree of saturation of at least 80 percent. This resin may preferably have a molecular weight of about 500 to about 1500, especially about 650 to about 860, which corresponds to a softening point of about 105°–140° C. Such resins provide better cohesive strength and mechanical properties than do similar resins of lower softening points. The resin is most preferably a saturated terpolymer of alpha methylstyrene, methylstyrene, and indene.

In addition to the above mentioned components, the adhesive resin may contain small amounts of other materials commonly used and known in the art, such as antioxidants, stabilizers, and fillers.

The adhesive resin composition is prepared by blending the above described components by any suitable means, such as melt blending, extruding, etc. The composition provides excellent adhesion in a composite structure containing a structural layer of a styrene-type resin layer, a vinyl chloride resin layer, or a polycarbonate resin layer, and a barrier layer such as polyamide or ethylene vinyl alcohol copolymer. Structures containing styrene-type resins show excellent extrudability and good forming processability over a wide range of temperatures. The combination of processability and barrier properties provided by such composite structures make them useful in applications such as packaging, disposable containers, etc. The structural layer may also be polyethylene, as good adhesion is provided therefor and since polyethylene is often used as an inner or food contact layer of a laminated structure.

EXAMPLES

Adhesive blends were prepared by dry blending the ingredients in a polyethylene bag and subsequently melt blending at 210° to 230° C. in a 28 or 30 mm twin screw extruder with a vacuum port. Each of the blends, listed in the Table, also contained about 0.10 weight percent Irganox TM 1010 hindered polyphenol stabilizer (not separately reported in the Table).

Each of the blends was coextruded from a 25 mm single screw extruder operated at 4 to 6 r.p.m., through a coextrusion die. On one side of the blend was extruded a layer of high impact polystyrene (HIPS) from a 38 mm extruder at 8 to 12 r.p.m, and on the other side was extruded a layer of ethylene vinyl alcohol copolymer (EVOH) containing 33 mole percent ethylene from a 38 mm extruder at 30 to 45 r.p.m. The barrel temperature of each extruder was set at 230° C.; the chill rolls over which the extrudate was passed were maintained at 100° C. The take-up speed for the extruded sheet was about 1.5 m/min. The thickness of the layers is indicated in the Tables.

The laminates thus prepared were evaluated by measuring their peel strength. Peel strength was measured by ASTM D 1876-72, modified in that the test was run at 305 mm/min, rather than 254 mm/min, and 3 to 6 duplicates of each sample were measured, rather than 10. Results from this test, in a "T" configuration, are indicated in the Table.

The results in the Table show the superiority of the adhesive compositions within the scope of the present invention. Examples 1–33 represent laminates made using the adhesive of the present invention. In particular, laminates incorporating adhesives based on copolymers containing vinyl acetate comonomer at levels of 9–28 weight percent are illustrated, as well as a terpolymer of ethylene with n-butyl acrylate and carbon monoxide (Ex. 28). The "T" peel strength for such laminates is with few exceptions at least about 300 N/m, and in many cases well over 500 N/m. (Example 31 shows a comparatively low peel strength even though it is within the scope of this invention. The explanation for this particular result is not fully known, but is believed to be related to experimental uncertainty or errors.)

Laminates prepared outside the scope of the present invention are represented in Comparative Examples C1–C21. For these laminates the "T" peel strength is typically less than about 300 N/m, often much less. Comparative Examples C1–C7 and C18–C20 exhibit relatively low peel strengths because less than about 15% of polystyrene is present. For instance, Comparative Example C1 may be compared with Examples 1 and 13, while Comparative Example C3 may be compared with Example 15. It should be noted that in some of the Examples in which the amount of polystyrene is 15%, the lower limit of the invention, the benefit of the invention in terms of the improved peel strength is not fully expressed (e.g. Example 3).

Comparative Examples C8 and C9 in addition contain no hydrocarbon resin as a part of the blend. Comparative Examples C10 and C11 show low peel strength because the polymer blended with the graft copolymer is insufficiently compatible with the graft copolymer— in C10 because the percent vinyl acetate differs by 16%, and in C11 because the graft copolymer does not contain any vinyl acetate. (These Comparative Examples may be compared with Examples 8 and 11.) Similarly, Comparative Example C21 shows poor strength in part because the graft copolymer is based on polyethylene and thus does not have the specified minimum level of comonomer, even though the ungrafted copolymer, containing 9% vinyl acetate, is within 10 % in comonomer level. It should be noted that for Examples 14 and 19 the difference in vinyl acetate content of the copolymers is just 10%. Hence the improvment in peel strength is less marked than in some other cases. Comparative Examples C5–C10 show inferior results because a styrene-butadiene triblock copolymer was used instead of polystyrene. Note that for these Comparative Examples the peel strength stays at about the same low value whether or not (C14) hydrocarbon resin is present.

TABLE

| Ex. | PS μm | EVOH μm | Adhesive PS type[a] | % | E Copol type[b] | % | Graft Copol type[b] | % | % MAnh in Blend | HC Resin type[c] | % | Thick. μm | "T" Peel N/m |
|---|---|---|---|---|---|---|---|---|---|---|---|---|---|
| C1 | 193 | 61 | — | 0 | 25 | 88 | 28 | 7 | 0.11 | F | 5 | 10.2 | 316 |
| C2 | 223 | 71 | — | 0 | 12 | 78 | 9 | 7 | 0.11 | F | 15 | 10.2 | 351 |
| C3 | 193 | 61 | — | 0 | 25 | 78 | 28 | 7 | 0.11 | G | 15 | 10.2 | 351 |
| C4 | 224 | 102 | — | 0 | 28 | 64 | 25 | call | 0.11 | G | ca 25 | 20.3 | 368 |
| C5 | 193 | 81 | A | 5 | 25 | 83 | 28 | 7 | 0.11 | F | 5 | 20.3 | 368 |
| C6 | 193 | 61 | A | 5 | 25 | 78 | 28 | 7 | 0.11 | F | 10 | 10.2 | 158 |
| C7 | 203 | 61 | A | 5 | 25 | 73 | 28 | 7 | 0.11 | F | 15 | 10.2 | 351 |
| 1 | 203 | 71 | A | 15 | 25 | 73 | 28 | 7 | 0.11 | F | 5 | 20.3 | 333 |
| 2 | 193 | 71 | A | 15 | 25 | 68 | 28 | 7 | 0.11 | F | 10 | 20.3 | 736 |
| 3 | 223 | 102 | A | 15 | 28 | 64.9 | 25 | 10.1 | 0.11 | F | 10 | 20.3 | 245 |
| 4 | 203 | 61 | A | 15 | 25 | 63 | 28 | 7 | 0.11 | F | 15 | 10.1 | 456 |
| 5 | 243 | 102 | A | 30 | 28 | 55 | 18 | 10 | 0.11 | G | 5 | 30.5 | 561 |
| 6 | 203 | 61 | A | 30 | 25 | 58 | 28 | 7 | 0.11 | F | 5 | 20.3 | 438 |
| 7 | 193 | 71 | A | 30 | 25 | 53 | 28 | 7 | 0.11 | F | 10 | 20.3 | 508 |
| 8 | 203 | 61 | A | 30 | 25 | 48 | 28 | 7 | 0.11 | F | 15 | 20.3 | 666 |
| 9 | 234 | 81 | A | 30 | 28 | 45 | 18 | 10 | 0.11 | G | 15 | 20.3 | 771 |
| 10 | 245 | 91 | A | 30 | 28 | 45 | 18 | 10 | 0.11 | G | 15 | 30.5 | 1017 |
| 11 | 183 | 81 | A | 30 | 28 | 48 | 28 | 7 | 0.11 | G | 15 | 20.3 | 674 |
| 12 | 244 | 91 | A | 38 | 28 | 47 | 25 | 10 | 0.11 | G | 5 | 20.3 | 473 |
| 13 | 244 | 102 | A | 38 | 28 | 37 | 25 | 10 | 0.11 | G | 15 | 30.5 | 666 |
| 14 | 254 | 91 | A | 45 | 28 | 30 | 18 | 20 | 0.11 | G | 5 | 40.6 | 245 |
| 15 | 163 | 61 | A | 45 | 28 | 30 | 25 | 15 | 0.11 | G | 10 | 20.3 | 579 |
| 16 | 244 | 81 | A | 45 | 28 | 35 | 25 | 10 | 0.11 | G | 10 | 30.5 | 491 |
| 17 | 234 | 91 | A | 45 | 28 | 30 | 18 | 10 | 0.11 | G | 15 | 20.3 | 546 |
| C8 | 198 | 91 | — | 0 | 28 | 83.4 | 28 | 16.6 | 0.15 | — | 0 | 20.3 | 140 |
| C9 | 193 | 91 | A | 10 | 28 | 75 | 18 | 15 | 0.16 | — | 0 | 20.3 | 228 |
| C10 | 213 | 81 | A | 30 | 25 | 48 | 9 | 7 | 0.11 | F | 15 | 20.3 | 210 |
| C11 | 183 | 71 | A | 30 | 25 | 48 | PE | 7 | 0.11 | F | 15 | 20.3 | 88 |
| C12 | 224 | 91 | B | 30 | 28 | 45 | 18 | 10 | 0.11 | G | 15 | 30.5 | 228 |
| C13 | 234 | 112 | B | 30 | 18 | 45 | 18 | 15 | 0.11 | G | 10 | 30.5 | 228 |
| C14 | 234 | 81 | B | 45 | 28' | 45 | 18 | 10 | 0.11 | — | 0 | 20.3 | 228 |
| C15 | 234 | 91 | B | 45 | 28' | 35 | 18 | 10 | 0.11 | G | 10 | 30.5 | 298 |
| C16 | 234 | 91 | B | 45 | 18 | 35 | 18 | 10 | 0.11 | G | 10 | 30.5 | 193 |
| C17 | 254 | 112 | B | 45 | 18 | 30 | 18 | 10 | 0.11 | G | 15 | 10.2 | 105 |
| C18 | 224 | 61 | — | 0 | 9 | 78 | 9 | 7 | 0.11 | F | 15 | 30.5 | 175 |
| C19 | 254 | 81 | — | 0 | 25 | 78 | 28 | 7 | 0.11 | H | 15 | 20.3 | 245 |
| C20 | 254 | 91 | — | 0 | 18' | 68 | 9 | 7 | 0.11 | F | 25 | 10.2 | 298 |
| C21 | 254 | 61 | — | 0 | 9 | 78 | PE | 7 | 0.07 | F | 15 | 30.5 | 123 |
| 18 | 254 | 71 | A | 30 | 25 | 53 | 28 | 2 | 0.03 | F | 15 | 20.3 | 333 |
| 19 | 234 | 81 | A | 30 | 18' | 48 | 28 | 7 | 0.11 | F | 15 | 30.5 | 263 |
| 20 | 224 | 71 | A | 30 | 9 | 48 | 9 | 7 | 0.11 | F | 15 | 30.5 | 333 |
| 21 | 213 | 71 | A | 30 | 25 | 48 | 18 | 7 | 0.07 | F | 15 | 20.3 | 298 |
| 22 | 183 | 81 | A | 30 | 25 | 48 | 28 | 7 | 0.11 | F | 15 | 10.2 | 368 |
| 23 | 224 | 81 | A | 30 | 25 | 48 | 28 | 7 | 0.11 | F | 15 | 10.2 | 684 |
| 24 | 203 | 81 | A | 30 | 25 | 42 | 28 | 13 | 0.20 | F | 15 | 20.3 | 842 |
| 25 | 234 | 81 | A | 30 | 25 | 43 | 28 | 7 | 0.11 | F | 20 | 10.2 | 490 |
| 26 | 244 | 81 | A | 30 | 25 | 38 | 28 | 7 | 0.11 | F | 25 | 20.3 | 859 |
| 27 | 264 | 71 | A | 50 | 25 | 28 | 28 | 7 | 0.11 | F | 15 | 30.5 | 316 |
| 28 | 234 | 91 | A | 30 | N | 45 | N | 10 | 0.11 | F | 15 | 20.3 | 298 |
| C22 | 287 | 91 | — | 0 | M | 73 | M | 7 | 0.11 | F | 15 | 20.3 | 491 |
| 29 | 183 | 51 | A | 15 | 25 | 68 | 25 | 7 | 0.11 | F | 10 | 20.3 | 544 |
| 30 | 193 | 61 | A | 30 | 25 | 58 | 25 | 7 | 0.11 | F | 5 | 20.3 | 456 |
| 31 | 224 | 61 | A | 30 | 25 | 48 | 25 | 7 | 0.11 | F | 15 | 10.2 | 205 |
| 32 | 183 | 71 | A | 30 | 25 | 48 | 25 | 7 | 0.11 | F | 15 | 30.5 | 949 |
| 33 | 183 | 91 | A | 30 | 25 | 38 | 25 | 7 | 0.11 | F | 25 | 10.2 | 526 |

[a]PS, styrene polymer, was as indicated:
A: impact modified polystyrene HOS 850 from Huntsman Chemical.
B: styrene-butadiene triblock copolymer, Kraton TM G 1651 from Shell Chemical.
[b]Ethylene copolymer and graft copolymer type:
9: copolymer of ethylene with 9 wt % vinyl acetate, melt index 0.8 dg/min.
12: copolymer with 12 wt % VA, MI 2.5.
18: copolymer with 18 wt % VA, MI 8.
18': copolymer with 18 wt % VA, MI 0.8.
25: copolymer with 25 wt % VA, MI 2.
28: copolymer with 28 wt % VA, MI 6.
28': copolymer with 28 wt % VA, MI 25.
PE: high density polyethylene.
N: copolymer of ethylene with 30 wt % n-butyl acrylate and 10 wt % CO, MI 2.
M: copolymer of ethylene with 20 wt % methyl acrylate, MI 6.
(The melt indices of the graft copolymers do not correspond exactly to the above values, but all were within the range of 0.5 to 10 dg/min.)
[c]Hydrocarbon resin type:
F: Arkon TM P125, molecular weight 820, from Arakawa Chemical.
G: Arkon TM P140, mw 860, Arakawa Chemical.
H: Arkon TM P90, mw 650, Arakawa Chemical.

I claim:
1. An extrudable bonding resin composition consisting essentially of:

(a) about 35 to about 84 percent by weight of an ethylene copolymer portion consisting essentially of (i) about 1 to 100 percent by weight of a copolymer of about 45 to about 95 weight percent ethylene and about 5 to about 55 weight percent of at least one comonomer copolymerized therewith selected from the group consisting of unsaturated mono- or dicarboxylic acids of 2-20 carbon atoms, esters of said unsaturated mono- or dicarboxylic acids, vinyl esters of saturated carboxylic acids where the acid group has 1-18 carbon atoms, acrylonitrile, methacrylonitrile, and carbon monoxide, the carbon monoxide being present in an amount of 0 to about 30 weight percent; and a grafted comonomer containing pendant carboxylic acid or carboxylic acid derivative functionality, wherein the amount of said grafted comonomer comprises about 0.03 to about 0.5 percent by weight of the total bonding resin composition, and (ii) 0 to about 99 percent by weight of a copolymer of about 45 to about 95 weight percent ethylene and about 5 to about 55 weight percent of at least one comonomer copolymerized therewith selected from the group consisting of unsaturated mono- or dicarboxylic acids of 2-20 carbon atoms, esters of said unsaturated mono- or dicarboxylic acids, vinyl esters of saturated carboxylic acids where the acid group has 1-18 carbon atoms, acrylonitrile, methacrylonitrile, and carbon monoxide, the carbon monoxide being present in an amount of 0 to about 30 weight percent, wherein the copolymer of (i) and the copolymer of (ii) contain at least one said copolymerized comonomer in common, the amount of each such common comonomer in the copolymer of (ii) being within about 10% of the amount of the corresponding comonomer in copolymer (i), and the total amount of said copolymerized comonomers other than such common comonomers in either copolymer being less than about 10%;

(b) about 15 to about 45 percent by weight polystyrene; and (c) about 1 to about 25 weight percent of a saturated alicyclic hydrocarbon resin modifier having a degree of saturation of at least about 80%.

2. The composition of claim 1 wherein the copolymer of (i) and the copolymer of (ii) contain the same copolymerized comonomers.

3. The composition of claim 2 wherein each comonomer in the copolymer of (ii) is within about 5% of the amount of the corresponding comonomer in copolymer (i).

4. The composition of claim 1 wherein the amount of ethylene copolymer portion is about 45 to about 65 weight percent, the polystyrene portion is about 30 to about 45 weight percent, and the saturated hydrocarbon resin portion is about 5 to about 25 weight percent of the composition.

5. The composition of claim 1 wherein the amount of comonomer in the copolymer of (i) and copolymer of (ii) each is about 9 to about 30 percent by weight.

6. The composition of claim 1 wherein the copolymer of (i) and the copolymer of (ii) are selected from the group consisting of ethylene vinyl acetate copolymer, ethylene methyl acrylate copolymer, ethylene n-butyl acrylate copolymer, and ethylene n-butyl acrylate carbon monoxide copolymer.

7. The composition of claim 6 wherein the copolymer of (i) and the copolymer of (ii) are ethylene vinyl acetate copolymer.

8. The composition of claim 1 wherein the carboxylic acid or carboxylic acid derivative is grafted onto polymer (i) in an amount of about 0.05 to about 5 weight percent.

9. The composition of claim 8 wherein the carboxylic acid or carboxylic acid derivative is an ethylenically unsaturated mono, di, or polycarboxylic acid, anhydride, salt, amide, imide, or ester.

10. The composition of claim 9 wherein the carboxylic acid or carboxylic acid derivative is acrylic acid, methacrylic acid, maleic acid, fumaric acid, itaconic acid, crotonic acid, itaconic anhydride, maleic anhydride, dimethyl maleic anhydride monosodium maleate, disodium maleate, diethyl fumarate, maleic anhydride and maleic acid.

11. The composition of claim 9 wherein the carboxylic acid or carboxylic acid derivative is an anhydride.

12. The composition of claim 11 wherein the anhydride is maleic anhydride.

13. The composition of claim 1 wherein the styrene polymer is impact modified polystyrene having an impact strength of at least about 92 J/m.

14. The composition of claim 1 wherein component (c) is a hydrocarbon resin having a molecular weight of about 650 to about 860.

15. The composition of claim 14 wherein the hydrocarbon resin is a saturated terpolymer of alpha-methyl styrene, methyl styrene, and indene.

16. A laminated structure comprising at least one structural layer, at least one barrier layer, and at least one bonding layer of the extrudable bonding resin composition of claim 1.

17. The laminated structure of claim 16 wherein the structural layer is high impact polystyrene and the barrier layer is ethylene vinyl alcohol copolymer.

18. The laminated structure of claim 16 wherein the structural layer is polyethylene and the barrier layer is ethylene vinyl alcohol copolymer.

* * * * *